(12) United States Patent
Caillaud et al.

(10) Patent No.: US 8,368,848 B2
(45) Date of Patent: Feb. 5, 2013

(54) METHOD FOR MANUFACTURING A PSFLC-BASED AND/OR PSAFLC-BASED ELECTROOPTIC CELL AND CORRESPONDING ELECTROOPTIC CELL, DEVICE AND HELMET

(75) Inventors: Bertrand Caillaud, Brest (FR); Pascal Gautier, Brest (FR); Jean-Louis De Bougrenet De La Tocnaye, Guilers (FR); Laurent Dupont, Plouzane (FR); Aline Guenot, Brest (FR)

(73) Assignees: Institut Telecom/Telecom Bretagne, Brest Cedex (FR); Lixys, Plouzane (FR)

( * ) Notice: Subject to any disclaimer, the term of this patent is extended or adjusted under 35 U.S.C. 154(b) by 586 days.

(21) Appl. No.: 12/594,796

(22) PCT Filed: Apr. 2, 2008

(86) PCT No.: PCT/EP2008/053910
§ 371 (c)(1),
(2), (4) Date: Oct. 5, 2009

(87) PCT Pub. No.: WO2008/125489
PCT Pub. Date: Oct. 23, 2008

(65) Prior Publication Data
US 2010/0039588 A1 Feb. 18, 2010

(30) Foreign Application Priority Data

Apr. 3, 2007 (FR) ...................... 07 02441

(51) Int. Cl.
*G02F 1/1333* (2006.01)
(52) U.S. Cl. ............... 349/93; 349/177; 349/186
(58) Field of Classification Search ................ None
See application file for complete search history.

(56) References Cited

U.S. PATENT DOCUMENTS

| | | | |
|---|---|---|---|
| 3,873,804 A * | 3/1975 | Gordon | 219/147 |
| 5,790,218 A | 8/1998 | Koden et al. | |
| 6,215,543 B1 * | 4/2001 | Mason et al. | 349/183 |
| 6,796,652 B1 | 9/2004 | Sonderegger | |
| 2001/0022641 A1 | 9/2001 | Choi et al. | |
| 2001/0024261 A1 | 9/2001 | Choi et al. | |

FOREIGN PATENT DOCUMENTS

| | | |
|---|---|---|
| EP | 0782032 A2 | 7/1997 |
| WO | 9427180 A1 | 11/1994 |
| WO | 0122906 A | 4/2001 |

OTHER PUBLICATIONS

Machine translation of abstract and constitution of JP 04179924, Jun. 28, 1992.* Hikmet R. A. M. et al.: Ferroelectric Liquid Crystal Gels Network Stabilized Ferroelectric Displays, Liquid Crystals, Taylor and Francis, Abingdon, Jul. 1, 1995.

(Continued)

*Primary Examiner* — Lucy Chien
(74) *Attorney, Agent, or Firm* — David D. Brush; Westman, Champlin & Kelly, P.A.

(57) ABSTRACT

A method is provided for manufacturing an electrooptic cell, which includes two plates of optically transparent material and at least one thickness of a composite gel based on a smectic liquid crystal and on a polymer provided between the plates, wherein the gel is in a smectic phase at ambient temperature. The method includes injecting a mixture of a ferroelectric and/or anti-ferroelectric smectic liquid and a monomer between the plates, wherein the monomer content of the mixture is between 5 and 25% by weight. The mixture is heated to above its smectic phase/nematic phase transmission temperature so that the mixture is in the nematic phase. The mixture is irradiated, by ultraviolet radiation, so as to polymerize the monomer and thus obtain the gel. During the irradiation step, an electric or magnetic field is applied to the mixture.

3 Claims, 5 Drawing Sheets

OTHER PUBLICATIONS

International Search Report dated Apr. 30, 2008 for corresponding International Application No. PCT/EP2008/053910 filed Apr. 2, 2008.

Preliminary Report on Patentability and Written Opinion dated Nov. 12, 2009 for corresponding International Application No. PCT/EP2008/053910, filed Apr. 2, 2008.

* cited by examiner

- Monomer
- Crystal liquid molecules

METHOD FOR MANUFACTURING A PSFLC-BASED AND/OR PSAFLC-BASED ELECTROOPTIC CELL AND CORRESPONDING ELECTROOPTIC CELL, DEVICE AND HELMET

CROSS-REFERENCE TO RELATED APPLICATIONS

This Application is a Section 371 National Stage Application of International Application No. PCT/EP2008/053910, filed Apr. 2, 2008 and published as WO 2008/125489 on Oct. 23, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of the design and production of optical components using liquid crystal-based materials and more specifically but not exclusively shutters.

The disclosure is particularly, but not exclusively, applicable to the production of shutters for helmets used to perform any arc welding operations or for the production of shutters for intense lasers or anti-glare systems.

BACKGROUND OF THE DISCLOSURE

It has been proposed in the prior art to provide arc welding helmets with shutters using liquid crystal-based materials fitted in the part of the helmet that is folded down onto the face. In particular, WO0122906 describes welding protection devices using standard liquid crystal (a nematic liquid crystal).

Such liquid crystal-based materials are materials wherein the optical properties can be modified, in particular the birefringence by applying an electrical field thereon. By inserting such liquid crystal-based materials into one or a plurality of cells, positioned between crossed polarizers and/or analyzers, shutters controllable with a voltage are obtained.

These helmets are switchable, i.e. the shuttering thereof is activated by an external optical signal (for example by activating the arc).

Such liquid crystal-based optical shutters may observe at least two states, i.e. at least one on-state, whereby they allow light to pass and a shuttered or off-state, wherein they do not allow light to pass or whereby they only allow a small portion thereof to pass.

In order to fulfill the function thereof correctly, the liquid crystal-based material contained therein must have a number of features.

Firstly, this material must have a satisfactory extinction in the visible range in question. For example, for the production of welding helmets, this extinction should be greater than or equal to 30 dB, in the visible band in question, i.e. 450 to 750 nm.

On the other hand, in the on-state(s), it should not induce excessive extinction. Again in the example of the production of welding helmets, this extinction in the on-state(s) must not be greater than 3 dB in the visible band in question.

Furthermore, such a material must, for numerous applications, be suitable to be provided on a relatively large surface. In the example of the production of arc welding helmets, this optical pupil should be at least equal to 1 $cm^2$ in the case of a square pupil, or have a diameter of at least 1.5 cm in the case of a circular pupil.

It should also be noted that such materials should advantageously have rapid shuttering response times (also referred to as switching times) preferably less than one millisecond for operation in stroboscopic mode on the target temperature range.

Such optical shutters should also have a satisfactory shock resistance, as they will be used under relatively difficult conditions and, for this very reason, have an operating range on relatively wide temperature ranges. For example, in the case of the production of welding helmets, the optical shutter should at least operate within a temperature range between −5 and 55° C.

Various optical shuttering devices are found in the prior art. Besides purely mechanical shutters, which enable complete shuttering but are slow, costly and frequently bulky, shutters using the electro-optic or magneto-optic effect are known. The majority using the electro-optic effect make use of liquid crystal-based materials, for example, which are the least costly. The contrast quality is linked with the features of the liquid crystal-based material, the polarizers and the number of cascaded liquid crystal-based material cells.

In this way, optical shutters using nematic liquid crystal-based materials and other shutters using smectic liquid crystal-based materials are known.

Smectic or nematic PDLC (Polymer dispersed liquid crystal)-based shutters are also known. Such PDLCs consist of the association of at least one liquid crystal (nematic or smectic) and polymer(s). The effect used is a diffusion effect (selective attenuation by means of varying degrees of diffusion). Therefore, it is not necessary to have crossed polarizers and/or analyzers in this case.

However, the optical shutters using liquid crystal-based materials known in the prior art have a number of drawbacks reducing their benefits for some applications such as the production of arc welding helmets in particular.

Nematic liquid crystals and nematic liquid crystal-based PDLCs have mediocre relaxation times of the order of a few dozen milliseconds, incompatible with operation in stroboscopic mode, associated with the use of some electric arc modes.

Smectic liquid crystals (ferroelectric FLC or antiferroelectric AFLC) are more rapid than nematics but have specific defects on large pupils and are more fragile. In addition, they can only be used with small thicknesses.

A manner to prevent defect formation consists of using polymer gel stabilization (PSLC for "Polymer Stabilized Liquid Crystal" or PSAFLC for "Polymer Stabilized Anti-ferroelectric Liquid Crystal") without adversely affecting the rapid response (or switching) times of smectics (PSFLC or PSAFLC).

PSFLCs or PSAFLCs consist, like PDLCs, of the association of liquid crystal and polymer but differ therefrom in that the polymer is not encapsulated therein in droplet form. In PSFLCs (or PSAFLCs), the liquid crystal and polymer form a composite gel wherein the liquid crystal phase is interconnected.

PSFLC (or PSAFLC) structures have different features according to the polymer content of the mixture. For high concentrations (greater than 10% by weight of polymer), the polymer network structure predominantly affects the features of the liquid crystal.

Figure 1A:
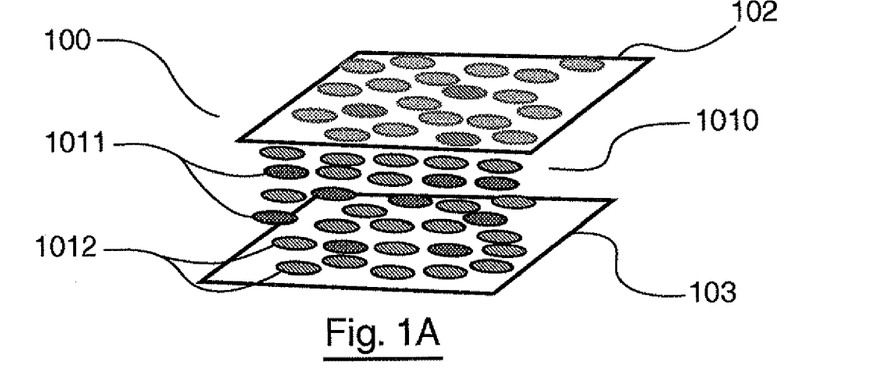
FIGS. 1A to 1C illustrate the first (FIG. 1A), second (FIG. 1B) and third (FIG. 1C) steps of a conventional method for manufacturing a cell, for example of a shutter, based on a thickness of PSFLC material between a first and second optically transparent plates.
Figure 1B:
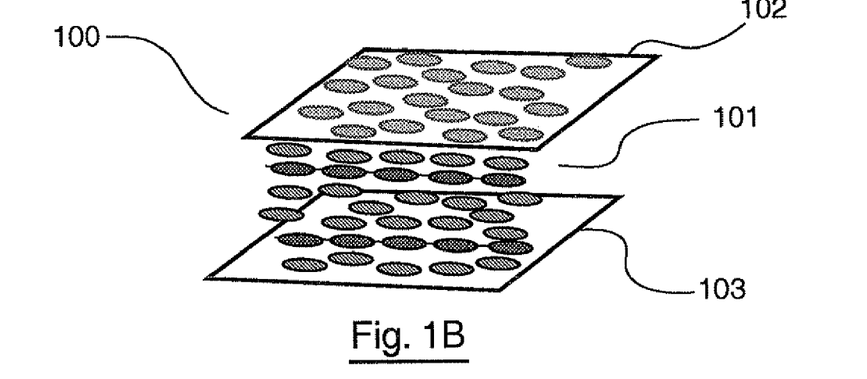
Figure 1C:
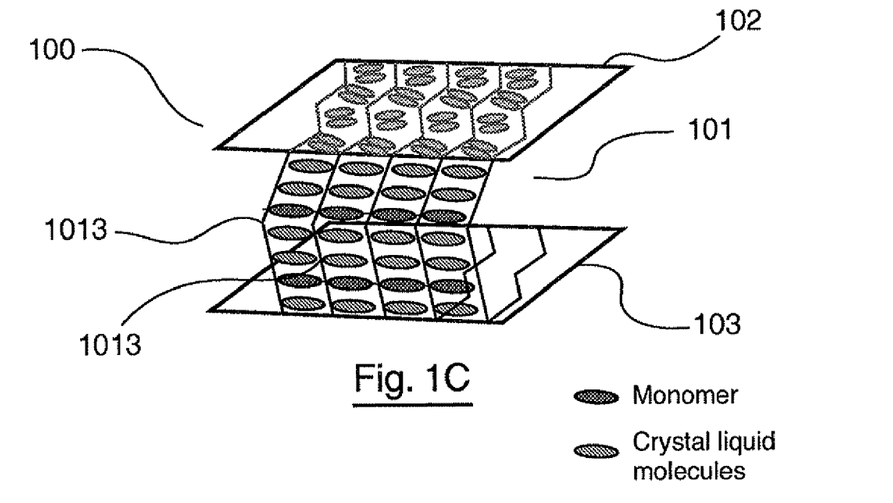

With reference to FIGS. 1A to 1C, diagrams illustrating a conventional method for manufacturing a cell 100 based on a thickness of PSFLC material 101 between a first 102 and a second 103 optically transparent plate (for example glass) is shown. This cell is for example manufactured to produce a shutter.

In a first step (illustrated in FIG. 1A), the mixture 1010 of smectic liquid crystals and monomer (wherein the monomer content is such that a gel can be formed) is heated to a temperature $T_{nematic}$ above which the mixture changes from the smectic phase C* (wherein it is at ambient temperature) to the nematic phase whereby, as illustrated in FIG. 1A, the monomer molecules 1011 and the liquid crystal molecules 1012 are substantially oriented in the planes of the first and second optically transparent plates 102, 103.

In a second step (illustrated in FIG. 1B) conventional irradiation is performed, using ultraviolet (UV) radiation, on said mixture 1010 so as to polymerize the monomer and thus obtain a thickness of PSFLC 101 in the nematic phase.

In a third step (illustrated in FIG. 1C), the cell 100 is cooled from $T_{nematic}$ to ambient temperature and the PSFLC 101 thus changes from the nematic phase to the smectic phase whereby it is organized in the form of smectic layers 1013. So as to finalize the shutter, the cell is placed between crossed polarizers and/or analyzers (not shown in FIG. 1A to 1C).

As illustrated in FIGS. 2A to 2D, in the smectic phase (for example after the cell 100 has returned to ambient temperature following said third step), the appearance of an angle between the directional line n (direction of all the liquid crystal molecules) and the normal line A to the smectic layers 1013 (FIG. 2A) of the cell 100 (the layers 1013 adopting, on entering the smectic phase, an arrangement whereby they are parallel with the normal line to the plane of the first 102 and second 103 plates) obtained causes compression of the layers 1013. In a confined geometry, this compression of the smectic layers 1013 is expressed by a double inclination of said smectic layers which form a herringbone (FIGS. 2B-2C) and/or stripe (FIG. 2D) structure.

This structure is modified when an electric field 120 is applied thereto to switch the PSFLC 101. This modification is characterized by a rectification of the smectic layers 1013 in the thickness of the cell 100 accompanied by an inclination in the other direction (FIG. 2D). This inclination is equivalent to undulation of layers in the plane of the first 102 and second 103 plates.

This structural change induces the formation of a diffraction network 130 diffracting in the plane of the first 102 and second 103 plates of the cell 100 accompanied by parasitic diffusion which may be detrimental or redhibitory for numerous applications, particularly wherein strong illuminations of the cell 100 are applied, for example in the case of the production of a shutter for arc welding helmets (or for an intense laser).

Indeed, this diffraction network 130 (diffracting in the plane of the plates of the cell 100) generates, from the primary incident light beam on the first plate 102 of the cell 100 supplied by the intense light source (welding arc or intense laser), a secondary beam from the second plate 103 which, for example, blinds the user of the arc welding helmet.

In this way, in the case of the arc welding helmet, the presence of specific defects of the use of liquid crystals in the smectic phase (C*) and the existence of regular diffracting and diffusing structures (particularly due to alignment layers, polymer chains, defects) may impair the visual comfort of the user.

SUMMARY

An aspect of the disclosure relates to a method for manufacturing an electro-optic cell comprising two plates of optically transparent material and at least one thickness of a composite gel based on a smectic liquid crystal and a polymer provided between said plates, said gel being in a smectic phase at ambient temperature, said method comprising the following steps:
- a mixture of a ferroelectric and/or anti-ferroelectric smectic liquid and of a monomer is injected between said plates, wherein the monomer content is between 5 and 25% by weight;
- the mixture is heated to above the smectic phase/nematic phase transition temperature thereof so that the mixture is in the nematic phase;
- the mixture is irradiated, by means of ultraviolet radiation, so as to polymerize the monomer and thus obtain said gel.

According to an embodiment of the invention, the manufacturing method is such that, during said irradiation step, an electric or magnetic field is applied to the mixture.

The general principle of an embodiment of the invention includes applying an electric field (or magnetic field) to a mixture of smectic liquid crystal in the nematic temperature phase and of monomer during the irradiation thereof within the scope of the production of a cell based on a PSFLC and/or PSAFLC material so that the resulting material (composite gel) is organized in the form of a plurality of smectic layers, each being inclined by an angle α with respect to the normal line to the plane of the cell (or cell plates).

In this way, double inclination of said smectic layers no longer occurs and, especially, these smectic layers do not form a herringbone and/or stripe structure.

In this way, the application of an electric field to switch the PSFLC and/or PSAFLC of the cell no longer generates a diffraction network diffracting in the plane of the cell plates (or plane of the cell).

In this way, for example in the case of the production of a shutter using a cell according to an embodiment of the invention, the manufacturing method according to an embodiment of the invention makes it possible to reduce the secondary beam generation phenomenon from the shutter, the secondary beam being generated from a primary incident light beam on the shutter supplied by an intense light source (for example a welding arc).

Furthermore, the inclination of the layers of PSFLC by an angle α with respect to the normal line to the plane of the cell plates makes it possible to reduce the main defects of the polymer matrix of the PSFLC and/or PSAFLC.

Preferentially, the method comprises a step for selecting a given amplitude value of the electric or magnetic field applied to the mixture such that the gel is organized in the form of a plurality of smectic layers, each being inclined by a given angle α with respect to the normal line to the plane of the plates.

Preferentially, the monomer content of the mixture is between 10% and 15% by weight. This monomer content range by weight makes it possible to obtain a gel with optimized properties. In particular, this range ensures that a gel with few defects and which is robust is obtained.

An embodiment of the invention also relates to an electro-optic cell comprising two plates of optically transparent material and at least one thickness of a composite gel based on a smectic liquid crystal and a polymer provided between said plates, said gel being in a smectic phase at ambient temperature.

According to an embodiment of the invention, the gel is organized in the form of a plurality of smectic layers, each being inclined by a given angle α with respect to the normal line to the plane of the plates.

Preferentially, the angle is adjusted beforehand as a function of an amplitude of an electric or magnetic field applied to the gel during prior irradiation of the gel.

Advantageously, the monomer content of the gel is between 10 and 15% by weight.

An embodiment of the invention also relates to an electro-optic shuttering device comprising at least one electro-optic cell obtained by the manufacturing method as described above.

An embodiment of the invention also relates to an arc welding helmet equipped with at least one shuttering device comprising at least one electro-optic cell obtained by the manufacturing method as described above.

BRIEF DESCRIPTION OF THE DRAWINGS

Other features and advantages of will emerge more clearly on reading the following description of a plurality of embodiments, given merely as illustrative and non-limitative examples, and the appended figures, wherein.

DETAILED DESCRIPTION OF ILLUSTRATIVE EMBODIMENTS

Figure 3:
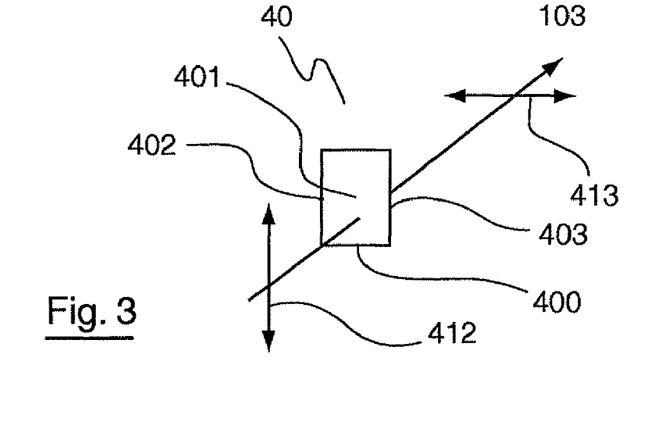
FIG. 3 shows a diagram of an electro-optic shuttering device comprising the PSFLC cell according to a particular embodiment of the invention.

With reference to FIG. 3, a diagram of an electro-optic shuttering device 40 according to a particular embodiment of the invention is shown.

This shuttering device 40 is fitted, for example, in an arc welding helmet. However, it may be contained in any other equipment requiring the protection of light-sensitive material or also in an intense laser beam shuttering device.

Hereinafter, the example whereby the cell 400 according to the particular embodiment of the invention is fitted in a shuttering device is used. However, naturally, the cell 400 may be used in any other application such as, for example, to produce a display device.

This shuttering device 40 comprises a cell 400 (obtained by means of the method described hereinafter with reference to FIGS. 4A to 4C) including a first 402 and a second 403 optically transparent plates (naturally, according to the alternative embodiments of this particular embodiment, the shuttering device 40 may comprise a plurality of cells and each cell may be produced with plates of any material such as glass, optically transparent plastic, etc.), for example, coated with a polarizing film cutting off wavelengths less than 450 nm and greater than 750 nm and a polarizing film (made of dichroic material).

The first 402 and second 403 optically transparent plates of the cell 400 define a space receiving a thickness of PSFLC 401 according to the particular embodiment of the invention. According to this particular embodiment of the invention, the thickness of PSFLC 401 between the plates of the cell is approximately 2 μm.

For example, the PSFLC 401 of the shuttering device 40 according to the particular embodiment of the invention includes mixture of Felix 015/100 (registered trademark) liquid crystals and the polymer obtained by polymerizing RM257 (registered trademark) monomer as cited in the French patent application No. 06/04153.

Preferentially, the PSFLC 401 according to the particular embodiment of the invention forms a composite gel based on smectic liquid crystal and polymer. The polymer content range by weight selected (between 5% and 25%) makes it possible to obtain a material with optimized properties.

The cell 400 interacts with a pair of polarizers assembled as "crossed polarizers" and hereinafter referred to as polarizer 412 and analyzer 413.

Figure 4A:
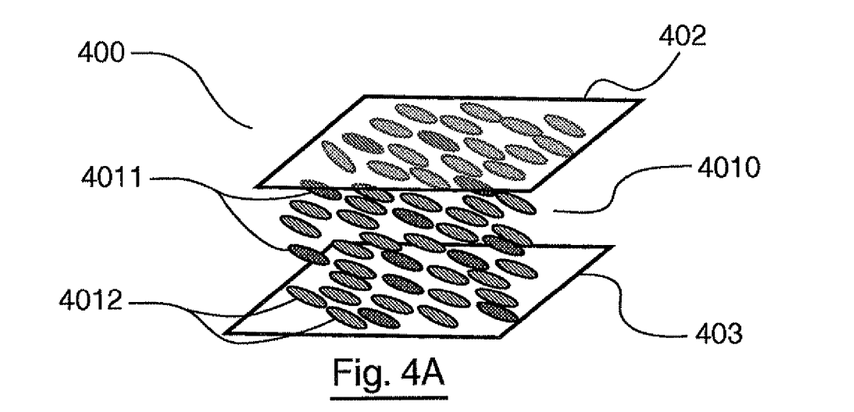
FIGS. 4A to 4C illustrate the first (FIG. 4A), second (FIG. 4B) and third (FIG. 4C) steps of a manufacturing method according to the particular embodiment of the invention of the cell based on the thickness of PSFLC material between the first and second optically transparent plates.
Figure 4B:
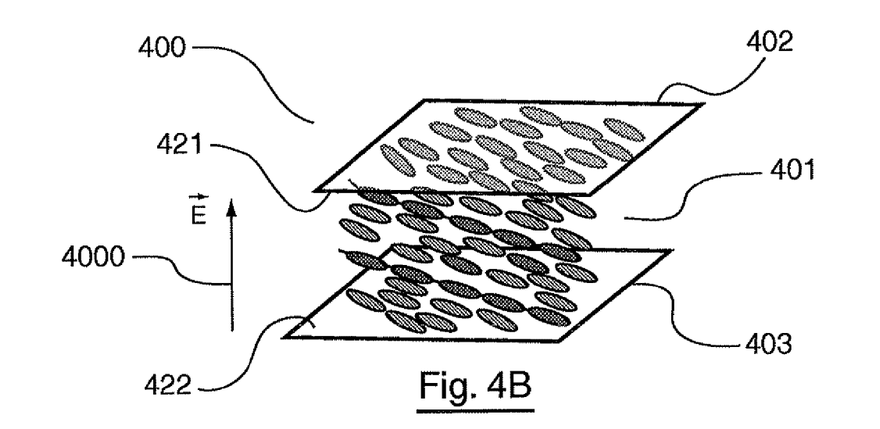
Figure 4C:
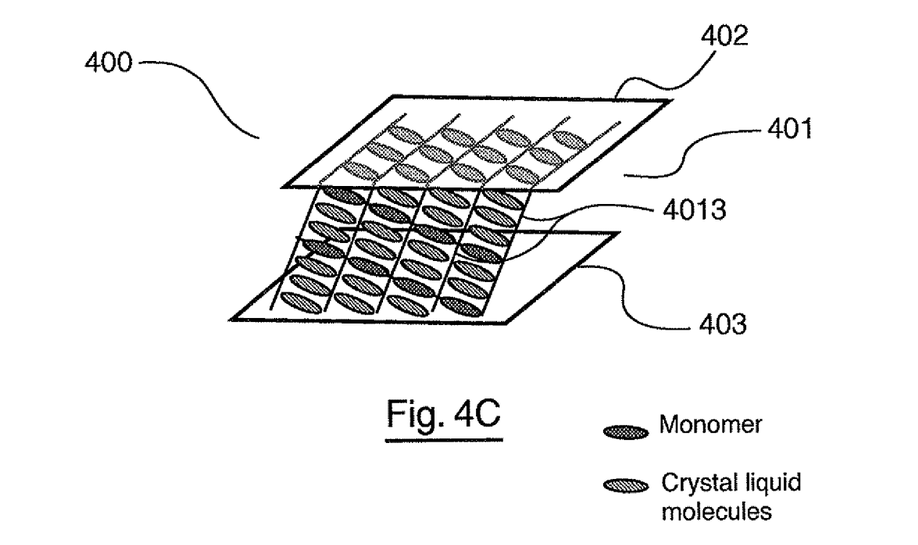

With reference to FIGS. 4A to 4C, diagrams illustrating a method for manufacturing according to the particular embodiment of the invention the cell 400 based on the thickness of PSFLC material 401 between the first 402 and second 403 optically transparent plates are shown.

In a first step (illustrated in FIG. 4A), a mixture 4010 of Felix 015/100 smectic liquid crystals and RM527 monomer (wherein the monomer content is 10% by weight) is heated to a temperature (for example 70° C.) greater than the transition temperature ($T_{nematic}$) between the smectic phase and the nematic phase of the mixture.

At this temperature, the mixture changes from the smectic phase (wherein it is found at ambient temperature) to the nematic phase whereby, as illustrated in FIG. 4A, the monomer molecules 4011 and the liquid crystal molecules 4012 are substantially oriented in the plane of the first and second optically transparent plates 402, 403. The value of the transition temperature between the smectic phase and the nematic phase ($T_{nematic}$) is approximately 70° C. (it is generally between 67° C. and 73° C. for other Felix 015/100 (liquid crystal)/RM257 (monomer) mixtures in proportions making it possible to obtain PSFLCs).

In a second step (illustrated in FIG. 4B), the abovementioned mixture 4010 is irradiated using ultraviolet (UV) radiation so as to polymerize the monomer and thus obtain a thickness of PSFLC 101 in the nematic phase. As illustrated in FIG. 4B, during said irradiation, an electric (or magnetic) field, for example an electric field 4000, having a value of 3V/μm is applied between a first electrode 421 (for example produced in the form of an ITO layer deposited on the first optically transparent plate 402 on the inside of the cell 400) on the first optically transparent plate 402 and a second electrode 422 (for example produced in the form of an ITO layer deposited on the second optically transparent plate 403 on the inside of the cell 400) on the second optically transparent plate 403.

In a third step (illustrated in FIG. 4C), the cell 400 is cooled from $T_{nematic}$ to ambient temperature and the PSFLC 401 thus changes from the nematic phase to the smectic phase thereof whereby it is organized in the form of smectic layers 4013. So as to finalize the shutter, the cell 400 is placed between the abovementioned crossed polarizer 412 and analyzer 413.

Figures 2A, 2B:
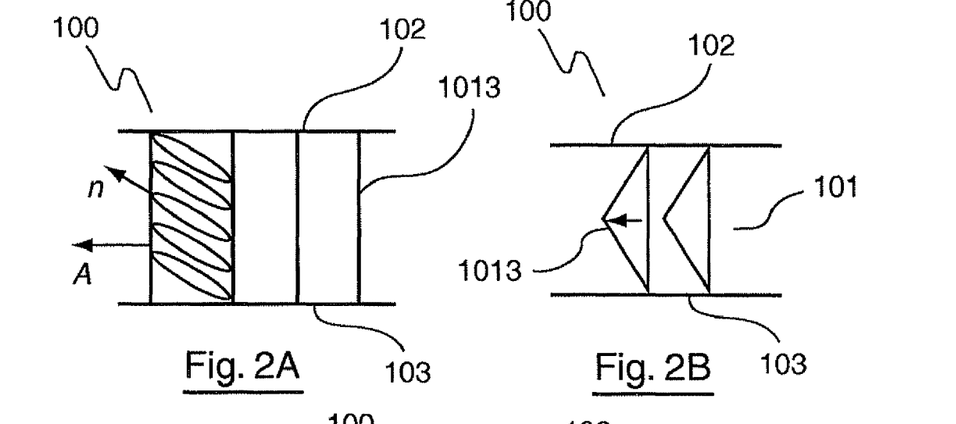
FIGS. 2A to 2D illustrate the influence of an angle between the direction line and the normal line to the layers (FIG. 2A) of the thickness of PSFLC in FIG. 1 on the compression of the layers of PSFLC generating a double inclination of the layers which forms a herringbone structure (FIGS. 2B and 2C) which is modified when an electric field is applied thereto (FIG. 2D)
Figure 2C:
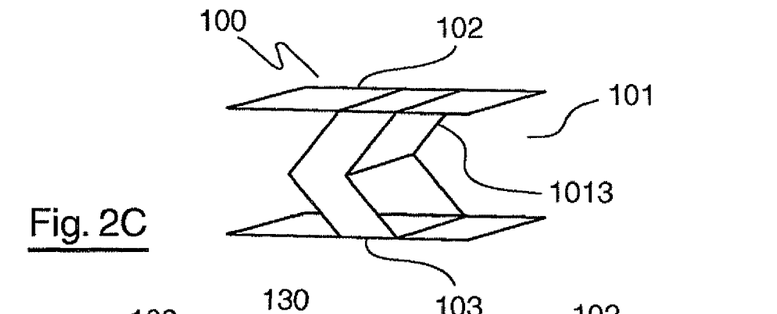
Figure 2D:
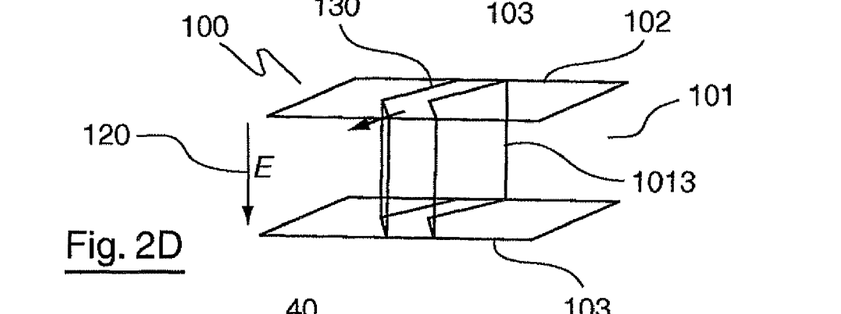
Figure 5:
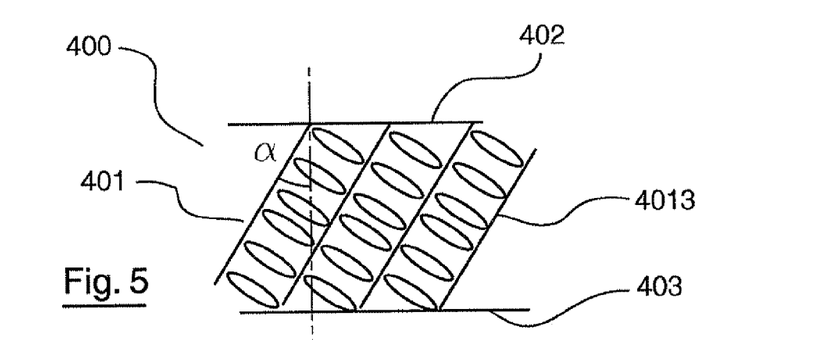
FIG. 5 shows a diagram of the PSFLC cell in smectic phase representing the layers of PSFLC which are inclined by an angle α with respect to the normal line to the plane of the first and second plates.

With reference to FIG. 5, a diagram of the cell 400 in the smectic phase (for example at ambient temperature) is shown, whereon the smectic layers 4013 of the PSFLC 401 which are inclined by an angle α with respect to the normal line to the plane of the first 402 and second 403 plates are represented (unlike the conventional manufacturing method in FIGS. 2A to 2C wherein no electric (magnetic) field is applied to the cell during the irradiation step and whereby the smectic layers 1013 are parallel with the normal line to the plane of the first 102 and second 103 plates).

In this way, in the case of this cell 400, no compression of the smectic layers 4013 or double inclination of said smectic layers occurs and, especially, said smectic layers do not form a herringbone and/or stripe structure.

It is important to note the existence of a pre-tilt due to the alignment layer as the application of an electric (magnetic) field during polymerization results in a unidirectional inclination of the smectic layers 4013.

In this way, the application of an electric field to switch the PSFLC 401 does not induce (or at the very least reduces), in the case of the cell 400 according to the particular embodiment of the invention, rectification of the smectic layers 4013 in the thickness of the cell 400 which would lead to undulation of the smectic layers in the plane of the first 402 and second 403 plates (as in the case of the abovementioned conventional cell 100). In this way, a diffraction network diffracting in the plane of the first 102 and second 103 plates of the cell is not generated.

In this way, for example when the shutter 40 is incorporated in an arc welding helmet, the manufacturing method according to an embodiment of the invention makes it possible to reduce the secondary beam generation phenomenon from the shutter, the secondary beam being generated from a primary incident light beam on the shutter supplied by an intense light source (for example a welding arc).

Furthermore, the inclination of the layers of PSFLC 4013 by an angle α with respect to the normal line to the plane of the first 402 and second 403 plates makes it possible to reduce the main defects of the polymer matrix of the PSFLC 401.

Moreover, as a function of the amplitude of the electric field 4000 applied during the irradiation step (second step illustrated in FIG. 4B) for the polymerization of the monomer, it is possible to control (adjust) the angle α and therefore the inclination of the smectic layers 4013.

Figure 6A:
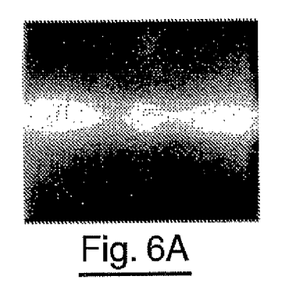
FIGS. 6A and 6B show images representing the light transmitted respectively by the cell obtained using the abovementioned conventional method (FIG. 6A) and by the cell obtained according to the particular embodiment of the invention (FIG. 6B) when said cells are in the off-state and are illuminated by a primary white light beam.
Figure 6B:
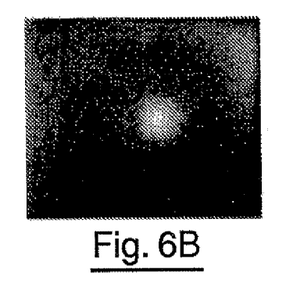
Figure 7A:
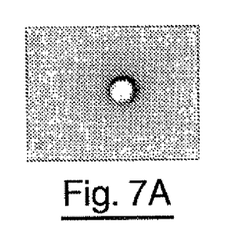
FIG. 7A to 7I show images of the X-ray diffraction figure obtained by means of transmission via the cell 400 according to the particular embodiment of the invention for angle of incidence values θ of 0°, 5°, 10°, 15°, 25°, 35°, 45°, −15° and −25° C., respectively.
Figure 7B:
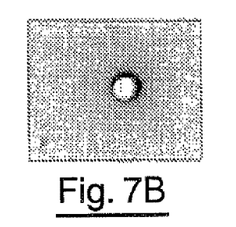
Figure 7C:
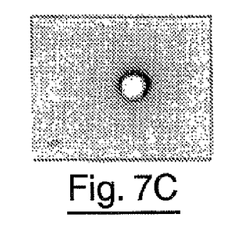
Figure 7D:
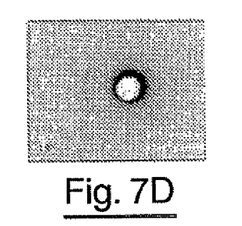
Figure 7E:
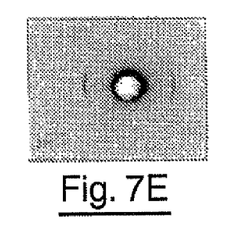
Figure 7F:
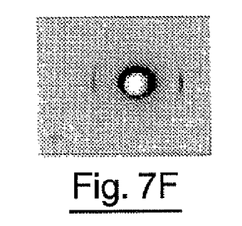
Figure 7G:
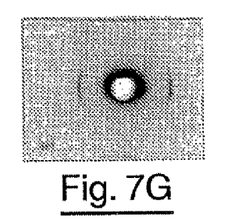
Figure 7H:
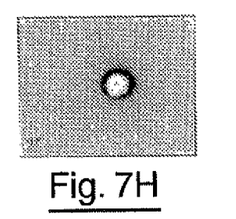
Figure 7I:
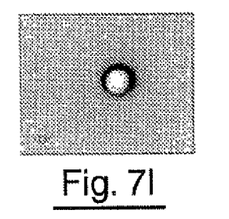

With reference to FIGS. 6A and 6B, images representing the light transmitted respectively by the cell 100 obtained using the abovementioned conventional method (FIG. 6A) and by the cell 400 obtained using the method according to particular embodiment of the invention (FIG. 6B) when the cells are in the off-state and are illuminated by a primary white light beam are shown.

In the image in relation to the conventional cell 100 (FIG. 6A), in addition to the spot corresponding to the small portion of the primary beam which is transmitted by the cell 100 in the off-state, two spots on either side of that relating to the primary beam may be observed.

These two spots relate to two secondary beams which are generated from the primary beam by the diffraction network 130.

These two spots do not appear in the image relating to the cell 400 according to the particular embodiment of the invention (FIG. 6B) which demonstrates that, in the case of this cell 400, a diffraction network diffracting in the plane of the first 102 and second 103 plates of the cell 400 is not generated.

Moreover, X-ray diffraction characterization (the principle whereof is explained in the appendix) of the structure of the thickness of PSFLC 401 of the cell 400 was applied so as to verify the absence of a diffraction network diffracting in the normal direction to the plane of the first 102 and second 103 plates of the cell 400. Indeed, X-ray diffraction on the cell 400 makes it possible to evaluate the conformation of the smectic layers 4013 in the presence of the polymer network for optimal interpretation of one "E-O" response of the thickness of PSFLC 401.

On the basis of curves (not shown) measuring the intensity transmitted as a function of the radial coordinate on the cell 400, it is easy to deduce the width of the smectic layers 4013 of the cell 400 as the value of the parameter q (see appendix) at the diffraction peak is linked with the thickness d of the layers 4013 by the following equation:

$$d = \frac{2\pi}{|\vec{q}|}$$

On the basis of these curves, it can be deduced that $|\vec{q}|=2.33$ nm$^{-1}$, which implies that d=27 Å (Angstroms).

With reference to FIGS. 7A to 7I, images of the X-ray diffraction figure obtained by means of transmission via the cell 400 according to the particular embodiment of the invention for angle of incidence values θ of 0°, 5°, 10°, 15°, 25°, 35°, 45°, −15° and −25° C., respectively, are shown.

In the light of FIGS. 7A to 7I, it can be noted that, in the case of the cell 400 according to the particular embodiment of the invention (and unlike the conventional cell 100), there are only two diffraction spots the intensity of which increases with the measurement of the rotation referenced by the angle of incidence θ of the cell 400 in the positive direction and becomes zero in the negative direction. In this way, the observation of two diffraction spots which are increasingly marked with the rotation of the cell 400 demonstrates an inclination of the smectic layers 4013. The disappearance of the Bragg reflection for negative angle of incidence θ values highlights the existence of a unidirectional orientation of the layers 4013 imposed by the electric field 400 during the irradiation and the disappearance of the herringbone structure.

When obtaining these images (FIG. 7A to 7I) of the X-ray diffraction figure obtained by means of transmission via the cell 400, the cell 400 is exposed to a parallel monochromatic X-ray beam having a wavelength 1.5418 Å corresponding to the line $K_\alpha$ of copper in the anti-cathode.

Appendix: Theoretical Principle of Conventional X-Ray Diffusion

Figure 8:
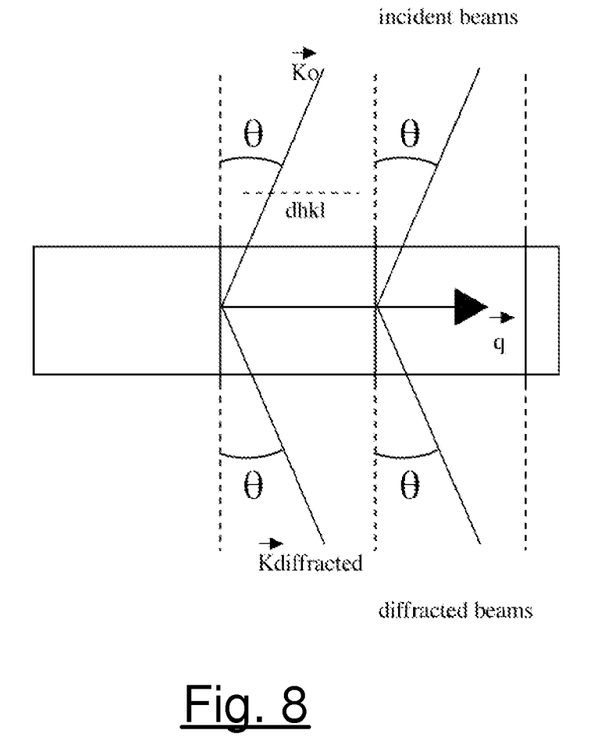
FIG. 8 illustrates X-ray diffraction on two reticular planes.

As the wavelength of X-rays is of the same order of magnitude as the inter-atomic distances (a few Angstrom), the interferences of the X-rays diffused will be alternatively constructive or destructive. Therefore, according to the spatial direction, a significant, or on the other hand, very low, flow of X photons will be obtained. FIG. 8 illustrates X-ray diffraction on two reticular planes.

The interferences are constructive for $\vec{K}_{incident} = \vec{K}_{diffracted} + \vec{q}$. The directions thereof can then be determined very simply using the following formula, known as Bragg's law:

$$2*d*\sin(q) = n*l$$

where d=inter-reticular distance, i.e. distance between two planes;

q=half-angle of deviation (half of the angle between the incident beam and the direction of the detector);

n=order of diffraction;

l=X-ray wavelength.

The diffraction diagram can be deduced from the intersection of a sphere referred to as Ewald's sphere with the reciprocal network of the material. The reciprocal network is an "artificial" structure linked directly with the actual material network with a mere change of base. Ewald's sphere is centered at the point of incidence of the beam on the cell and the radius thereof is 1:1 (see FIG. 9).

Figure 9:
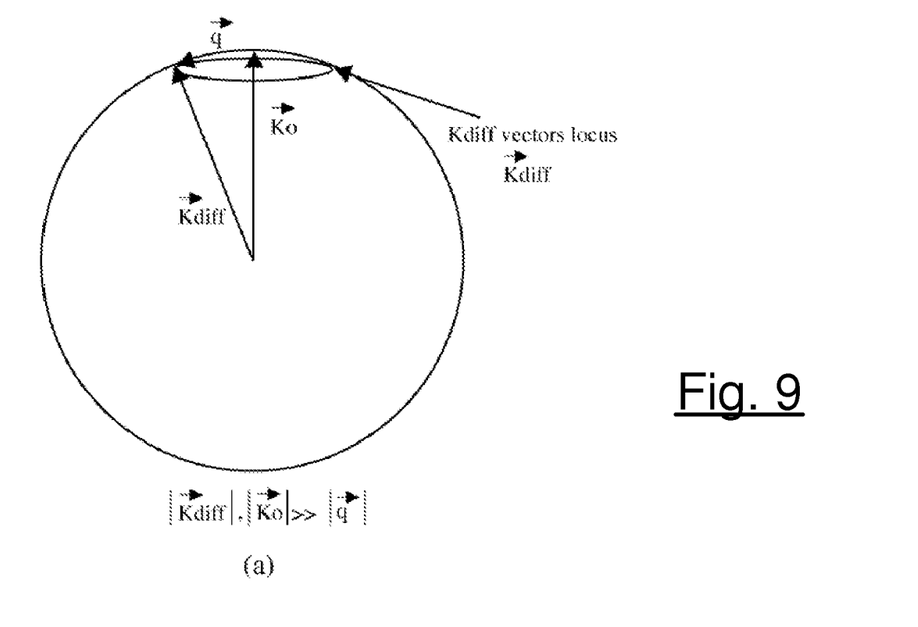
FIG. 9 is a representation of Ewald's sphere.

In such a schematic representation, each diffraction spot corresponds to the orientations of q on the sphere. It is also observed that the dimensions of |q| are very small with respect to $|K_{incident}|$ and $|K_{diffracted}|$ which makes it possible to compare the sphere at the intersections to a plane. This schematic representation enables easier interpretation of the diffraction figures obtained.

In conclusion, an embodiment of the disclosure provides a technique making it possible to reduce the effects caused by the diffraction network diffracting in the plane of a cell based on a composite liquid crystal and polymer (such as PSFLC and/or PSAFLC) gel, particularly when the cell is contained in an optical shutter.

An embodiment of the disclosure provides such a technique which makes it possible to reduce the effect of the specific defects of the use of liquid crystals in the smectic phase in such a cell.

An embodiment of the disclosure provides such a technique which is easy to implement, for a low cost.

Although the present disclosure has been described with reference to one or more examples, workers skilled in the art will recognize that changes may be made in form and detail without departing from the scope of the disclosure and/or the appended or issued claims thereof claims.

The invention claimed is:

1. A method for manufacturing an electro-optic cell comprising two plates of optically transparent material and at least one thickness of a composite gel based on a smectic liquid crystal and a polymer provided between said plates, said gel being in a smectic phase at ambient temperature, said method comprising the following steps:

injecting a mixture of a ferroelectric and/or anti-ferroelectric smectic liquid and of a monomer between said plates, wherein the monomer content is between 5 and 25% by weight;

heating the mixture to above the smectic phase/nematic phase transition temperature thereof so that the mixture is in the nematic phase;

irradiating the mixture in the nematic phase, by ultraviolet radiation, so as to polymerize the monomer and thus obtain said gel, and during said irradiation step, an electric or magnetic field is applied to the mixture in the nematic phase.

2. The method according to claim 1, wherein the method comprises a step of selecting a given amplitude value of the electric or magnetic field applied to the mixture in the nematic phase such that the gel is organized in the form of a plurality of smectic layers, each being inclined by a given angle α with respect to the normal line to the plane of the plates.

3. The method according to claim 1, wherein the monomer content of the mixture is between 10% and 15% by weight.

* * * * *